(12) United States Patent
Malladi et al.

(10) Patent No.: US 11,436,165 B2
(45) Date of Patent: Sep. 6, 2022

(54) HIGH BANDWIDTH MEMORY SYSTEM

(71) Applicant: Samsung Electronics Co., Ltd., Suwon-si (KR)

(72) Inventors: Krishna T. Malladi, San Jose, CA (US); Dimin Niu, Sunnyvale, CA (US); Hongzhong Zheng, Los Gatos, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/569,657

(22) Filed: Sep. 12, 2019

(65) Prior Publication Data

US 2020/0349093 A1    Nov. 5, 2020

Related U.S. Application Data

(60) Provisional application No. 62/841,815, filed on May 1, 2019.

(51) Int. Cl.
*G06F 13/36* (2006.01)
*G06F 13/16* (2006.01)
*G06F 12/06* (2006.01)

(52) U.S. Cl.
CPC ...... *G06F 13/1642* (2013.01); *G06F 12/0646* (2013.01); *G06F 2212/251* (2013.01)

(58) Field of Classification Search
None
See application file for complete search history.

(56) References Cited

U.S. PATENT DOCUMENTS 5,489,949 A * 2/1996 Jeong ............... H04N 5/145
   348/699
5,793,992 A * 8/1998 Steele ............... G06F 13/1605
   710/113

(Continued)

OTHER PUBLICATIONS

Nguyen, Tri Minh, "Exploring Data Compression and Random-Access Reduction to Mitigate the Bandwidth Wall for Manycore Architectures," Princeton University, ProQuest Dissertations Publishing, 2018, 10936059, Sep. 1, 2018, 220 pages.

(Continued)

*Primary Examiner* — Henry Tsai
*Assistant Examiner* — Dean Phan
(74) *Attorney, Agent, or Firm* — Renaissance IP Law Group LLP

(57) ABSTRACT

A high-bandwidth memory (HBM) includes a memory and a controller. The controller receives a data write request from a processor external to the HBM and the controller stores an entry in the memory indicating at least one address of data of the data write request and generates an indication that a data bus is available for an operation during a cycle time of the data write request based on the data write request comprising sparse data or data-value similarity. Sparse data includes a predetermined percentage of data values equal to zero, and data-value similarity includes a predetermined amount of spatial value locality of the data values. The predetermined percentage of data values equal to zero of sparse data and the predetermined amount of spatial value locality of the special-value pattern are both based on a predetermined data granularity.

20 Claims, 8 Drawing Sheets

(56) References Cited

U.S. PATENT DOCUMENTS

| | | | |
|---|---|---|---|
| 10,387,384 B1* | 8/2019 | Bent | G06F 16/166 |
| 2005/0141501 A1* | 6/2005 | Kadambi | H04L 12/46 |
| | | | 370/389 |
| 2018/0101742 A1* | 4/2018 | Burge | G06K 9/00926 |
| 2018/0189234 A1* | 7/2018 | Nurvitadhi | G06F 9/30036 |
| 2018/0315158 A1 | 11/2018 | Nurvitadhi et al. | |
| 2019/0065902 A1* | 2/2019 | Yoneoka | G06K 9/6298 |
| 2019/0095339 A1* | 3/2019 | Seningen | G06F 12/10 |

OTHER PUBLICATIONS

Sadi, Fazle, "Accelerating Sparse Matrix Kernels with Co-Optimized Architecture," Doctor of Philosophy in Electrical and Computer Engineering, Carnegie Mellon University, Dec. 1, 2018, 208 pages.

* cited by examiner

HIGH BANDWIDTH MEMORY SYSTEM

CROSS-REFERENCE TO RELATED APPLICATION

This application claims the priority benefit under 35 U.S.C. § 119(e) of U.S. Provisional Application No. 62/841,815, filed on May 1, 2019, the disclosure of which is incorporated herein by reference in its entirety.

TECHNICAL FIELD

The subject matter disclosed herein relates to high-bandwidth memories (HBMs). More specifically, the subject matter disclosed herein relates to a system and a method to reduce internal and external HBM accesses based on data characteristics, thereby improving overall performance of an HBM.

BACKGROUND

Machine-learning applications, like deep neural networks, use computations and memory to train on different datasets to provide accurate inferences. As high-performance computing (HPC) and graphics algorithms become further data and compute intensive, high-bandwidth memory requirements will likely become more important, particularly for accelerators like graphics processing units (GPUs) that are memory-pin limited.

SUMMARY

An example embodiment provides an HBM that may include a memory and a controller. The controller may receive a data write request from a processor external to the HBM, and the controller may be configured to: store an entry in the memory indicating at least one address of data of the data write request, wherein storing the entry is based on the data write request may include sparse data or a data-value similarity of data of the data write request, wherein sparse data comprises a predetermined percentage of data values of data of the data write request equal to zero and the data-value similarity may include a predetermined amount of spatial-value locality of data values of data of the data write request; and generate an indication that a data bus may be available for an operation during a cycle time of the data write request based on the data write request including sparse data or the data-value similarity. In one embodiment, the predetermined percentage of data values equal to zero may be based on a predetermined data granularity. In another embodiment, the predetermined amount of spatial value locality may be based on a predetermined data granularity.

Another example embodiment provides a system that may include a processor, an HBM, and a controller. The controller may include a memory and may be configured to: receive a data write request from the processor, store an entry in the memory of the controller indicating at least one address of data of the data write request based on the data write request that may include sparse data in which sparse data may include a predetermined percentage of data values of data of the data write request equal to zero, and generate an indication that a data bus may be available for an operation during a cycle time of the data write request based on the data write request including sparse data. In one embodiment, the predetermined percentage of data values equal to zero of sparse data may be based on a predetermined data granularity. In another embodiment, the controller may be further configured to store an entry in the memory of the controller indicating at least one address of data of the data write request based on data of the data write request further including data-value similarity, and to generate the indication that a data bus may be available for the operation during a cycle time of the data write request based on the data write request further including data-value similarity, and in which data of the data write request may include a predetermined amount of spatial value locality, and the predetermined amount of spatial value locality of the data-value similarity may be based on a predetermined data granularity.

An example embodiment provides a method that may include: receiving, at a controller of an HBM, a data write request from a processor external to the HBM; storing, by the controller, an entry in a memory of the controller that indicates at least one address of data of the data write request based on data of the data write request including sparse data or a data-value similarity of data of the data write request; and generating, by the controller, an indication that a data bus may be available for an operation during a cycle time of the data write request based on data of the data write request comprising data-value similarity in which sparse data may include a predetermined percentage of data values of data of the data write request equal to zero and the data-value similarity may include a predetermined amount of spatial-value locality of data values of data of the data write request. In one embodiment, the data of the data write request may include the predetermined amount of spatial value locality, the indication may be based on data of the data write comprising the predetermined amount of spatial value locality, and the method may further include: generating, by the controller, the indication that a data bus may be available for the operation during a cycle time of the data write request based on the data write request further including the predetermined amount of spatial value locality. In another embodiment, the data of the data write request may include the predetermined percentage of data values of data of the data write request equal to zero, the indication may be based on the data of the data write request including the predetermined percentage of data values of data of the data write request equal to zero, and in which method may further include: generating, by the controller, the indication that a data bus may be available for the operation during a cycle time of the data write request based on the data write request further comprising sparse data in which the predetermined percentage of data values equal to zero of sparse data may be based on a predetermined data granularity.

BRIEF DESCRIPTION OF THE DRAWING

Embodiments will be more clearly understood from the following brief description taken in conjunction with the accompanying drawings. The accompanying drawings represent non-limiting examples as described herein. In the following section, the aspects of the subject matter disclosed herein will be described with reference to exemplary embodiments illustrated in the figures in which like reference numerals refer to the same or similar elements, and in which.

DETAILED DESCRIPTION

Figure 1A:
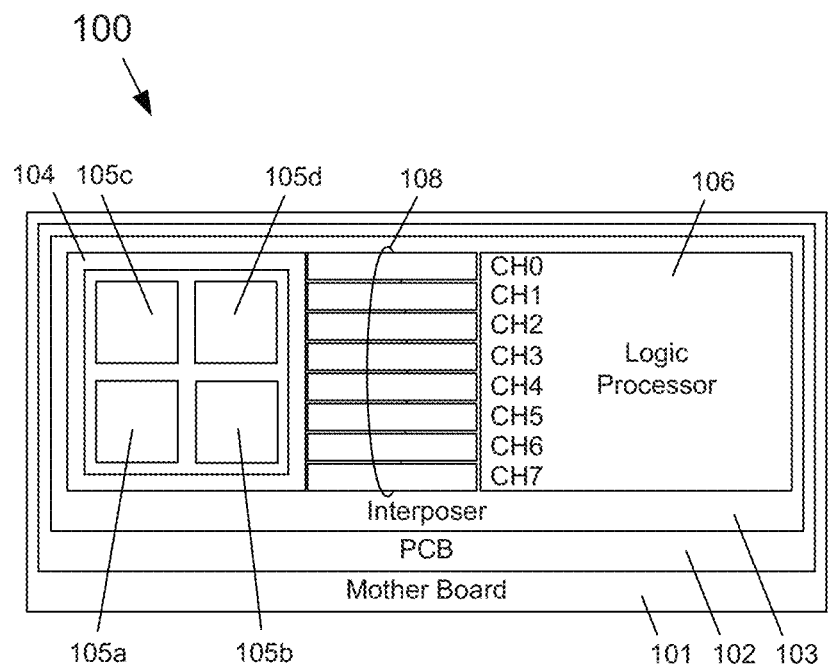
FIG. 1A depicts a plan view of an example embodiment of a typical HBM device according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. The various components and/or functional blocks disclosed herein may be embodied as modules that may include software, firmware and/or hardware that provide functionality described herein in connection with the various components and/or functional blocks.

Figure 1B:
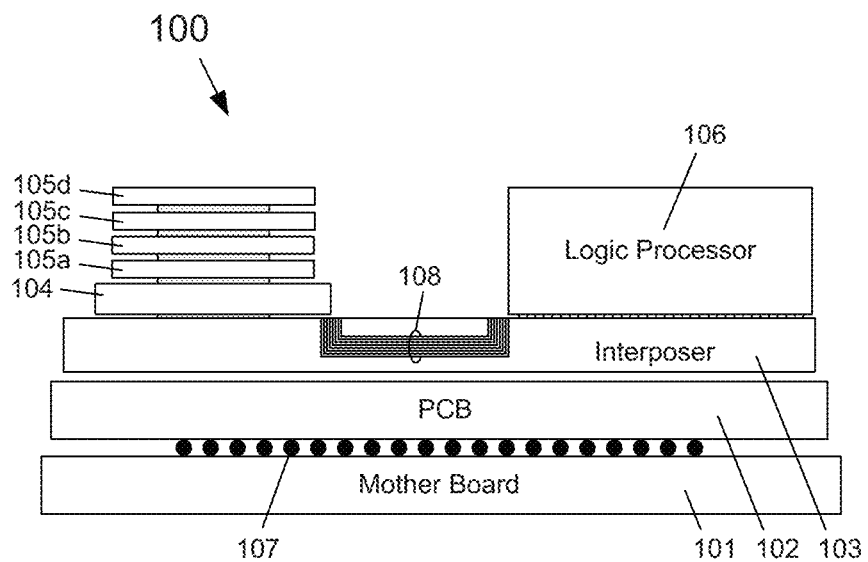
FIG. 1B depicts a side view of the example embodiment of the typical HBM device according to the subject matter disclosed herein.

FIG. 1A depicts a plan view of an example embodiment of a typical HBM device 100. FIG. 1B depicts a side view of the example embodiment of the typical HBM device 100. The HBM device 100 may include a motherboard 101, a printed circuit board (PCB) 102, an interposer 103, a buffer die 104, one or more dynamic random access memory (DRAM) chips of which DRAM chips 105a-105d are shown, and a host processing device (i.e., logic processor) 106, such as a central processing unit (CPU), a GPU, or a tensor processing device (TPU).

The PCB 102 may be electrically connected to the mother board 101 through an array of solder balls 107. The interposer 103 may be disposed on the PCB 102. The buffer die 104 may be disposed on the interposer 103. The DRAM chips 105 may be disposed in a stack on the buffer die 104. The buffer die 104 may be electrically connected to the host processing device 106 through an I/O bus 108 that may pass through the interposer 103. In one embodiment, the I/O bus 108 may include 1024 data lines and one or more control and address (CA) lines.

In one embodiment, the HBM 100 may be configured to have an HBM architecture that may include a 1024-bit wide data bus (i.e., part of I/O bus 108), and may provide a legacy mode and a pseudo-channel mode. In the legacy mode, the I/O bus 108 may be configured to have eight channels (CH0-CH7) of 128-bits per channel with a burst length (BL) of 2. Each channel in the legacy mode may have a dedicated CA bus. In the pseudo-channel mode, the I/O bus 108 may be configured to have 16 channels of 64-bits per channel with a burst length of 4. Two pseudo channels may share the same CA bus in the pseudo-channel mode.

Figure 2A:
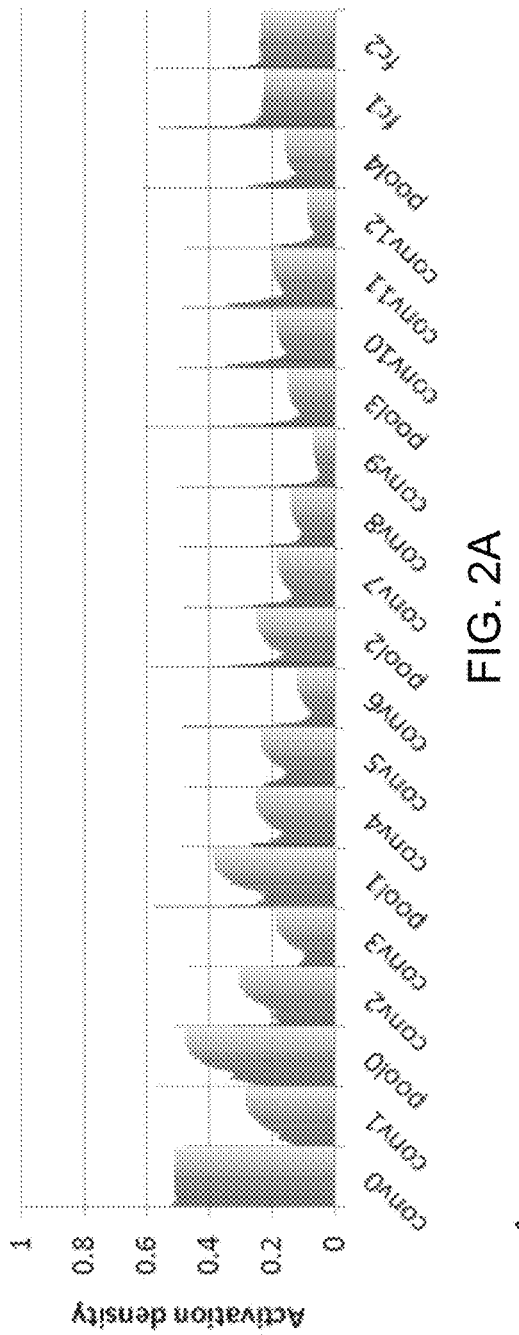
FIGS. 2A and 2B respectively depict example graphs of activation densities at different layers for two commonly used example neural networks according to the subject matter disclosed herein.
Figure 2B:
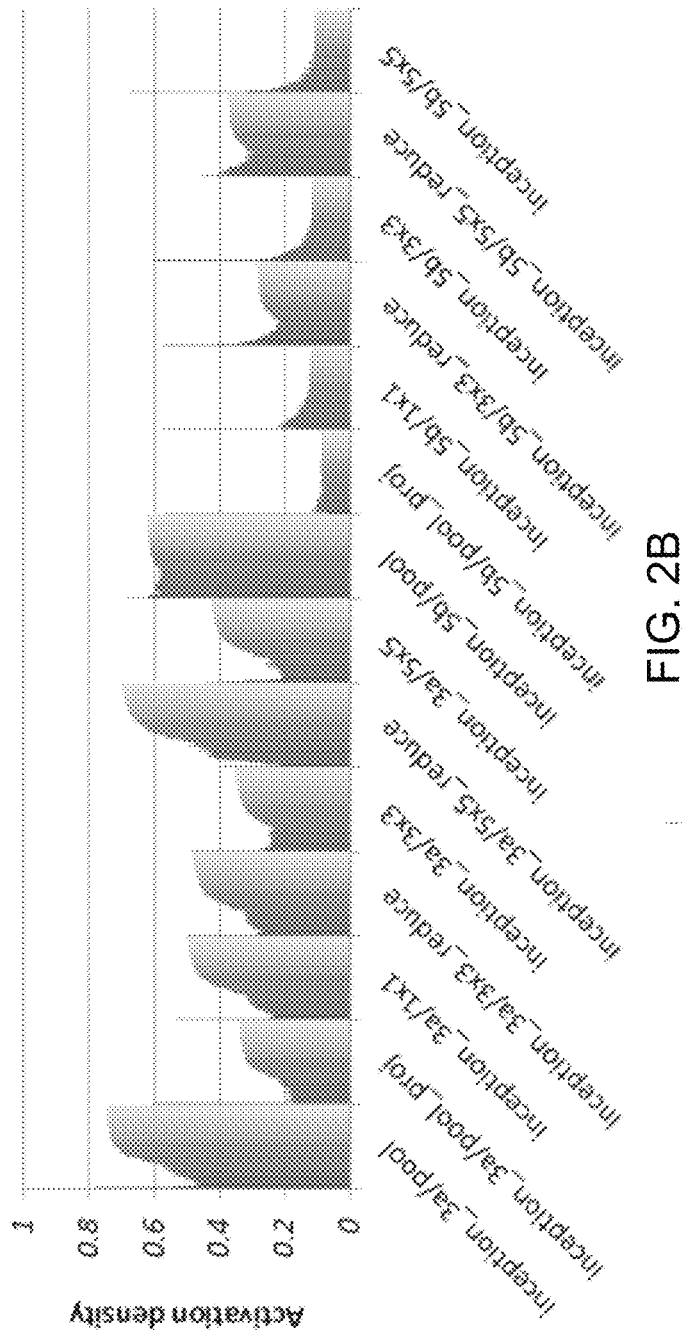

Deep-learning applications may exhibit data sparsity characteristics and/or data similarity characteristics that result from iterative floating-point/fixed-point operations. Data sparsity may generally result from either use of a rectified linear unit (ReLU) that clips negative values or use of low-precision weights during an inference phase. ReLUs or parametric rectified linear units (PReLus) that may reduce weight values are popular for use in convolution neural networks (CNNs) as well as ranking and recommendation models. But by far, the largest source of zeros occurs when a trained neural network is pruned by removing some of the weights to reduce the overall model size. Data similarity may be more common in CNNs mostly due to spatial locality of pixel values in images. Data-sparsity associated with deep-learning applications may grow to an average of about 40-50% based on, for example, rectified linear unit (ReLU) activation functions and/or zero weights. FIGS. 2A and 2B respectively depict example graphs of activation densities at different layers for two commonly used example neural networks. In each graph, the abscissa represents a given layer within the example neural network, and the ordinate represents an activation density (i.e., 1-sparsity). The specific activation density for each respective layer of the two commonly used example neural networks shows how the specific activation density changes as the network is trained. A specific activation density of, for example, 40% density would mean 60% of the activation values are zeros.

Address-map metadata that may be associated with the sparse data may grow to be on the order of many megabytes and locations of zero values in the address-map metadata may rapidly change during training of machine-learning models and may be difficult to track. Storing such metadata in an HBM that is off chip from a logic processor may increase look-up latency and may degrade HBM memory bandwidth. The subject matter disclosed herein provides functionality in a logic die stacked under an HBM memory to compactly store a zero-location bitmap in, for example, a static random access memory (SRAM), and which may be used for detecting sparse data memory writes that may be dropped or eliminated, and used for other bus operations.

Data may be organized in a structure of area (SOA) arrangement or an area of structure (AOS) arrangement. For example, pixel data, such as red (R), green (G) and blue (B) data, may be organized in an SOA arrangement in which the RGB data for each respective pixel is organized area of memory. The same RGB data for each pixel may be organized an AOS arrangement so that all R data are arranged together, all G data are arranged together, and all B data are arranged together. In either arrangement, a spatial locality of the data may contain data having similar patterns or values. Additionally, many floating-point data in deep-learning applications exhibit data locality in the exponent part of the floating-point values. That is, many values used in deep-learning applications may be between −1 and +1. Locality in data may be used to save HBM bus bandwidth and reduce toggle-rate dynamic power in HBM memory.

Figure 3:
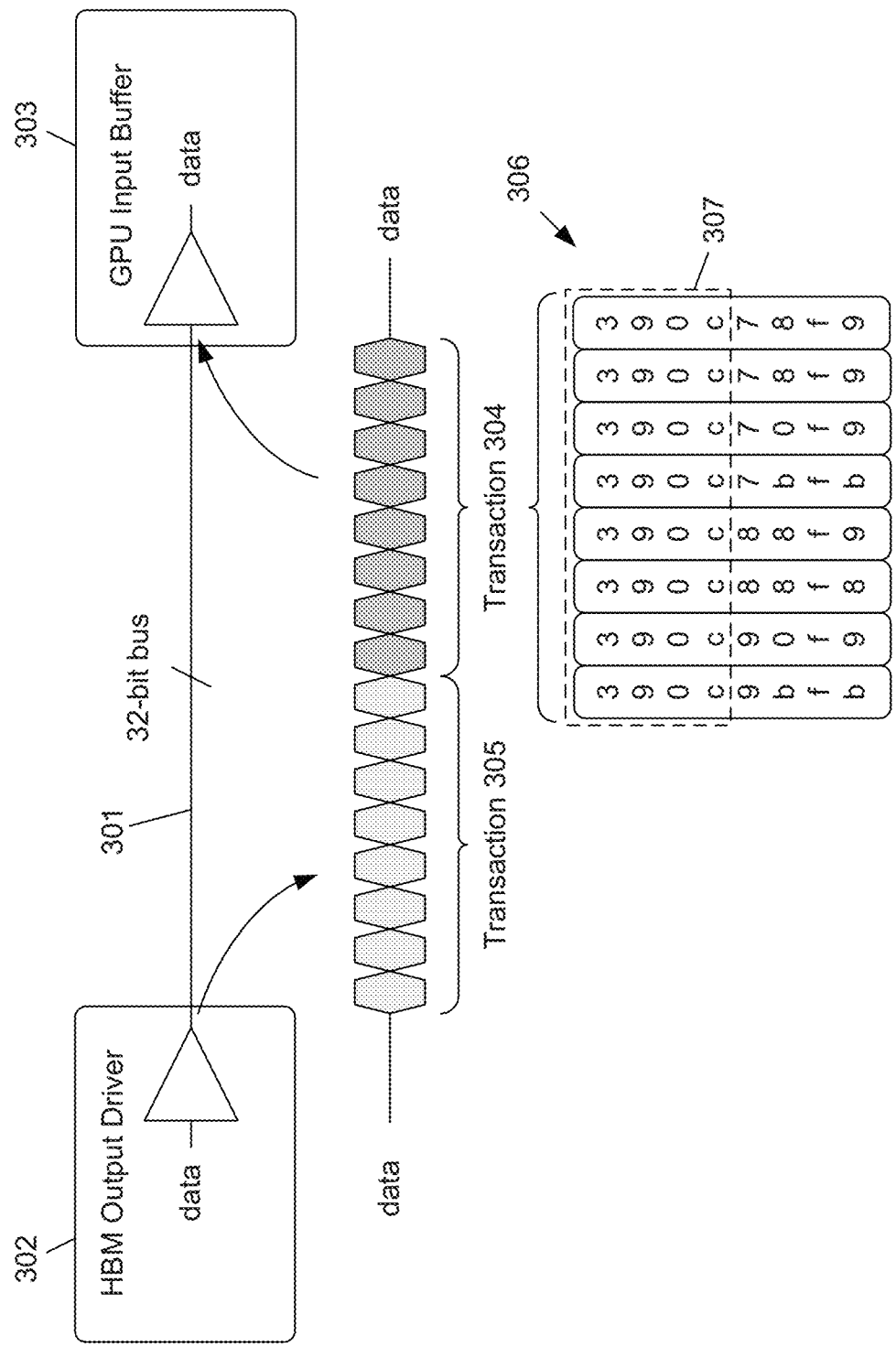
FIG. 3 depicts an example 32-bit data bus between an output driver of, for example, an HBM memory, and an input buffer of, for example, a GPU according to the subject matter disclosed herein.

FIG. 3 depicts an example 32-bit data bus 301 between an output driver 302 of, for example, an HBM memory, and an input buffer 303 of, for example, a GPU. A first transaction 304 and a second transaction 305 are depicted as being transmitted over the data bus 301 from the output driver 302 to the input buffer 303. Example contents of the first transaction 304 are shown at 306. The bits of transaction 304 indicated at 307 have similarity. In this particular case, the similarity of the bits indicated at 307 is all equal. In another embodiment, the similarity of the bits may not be that the bits are all equal, but having values within a predetermined range of values. In yet another embodiment, the particular position of the bits that may be determined to be similar may be different from the position indicated by 307. The similarity in the bits of transaction 304 may be used to save HBM bus bandwidth and reduce toggle-rate dynamic power in the HBM memory.

The subject matter disclosed herein provides HBM system architectures that use both of the data characteristics of data sparsity and data similarity to boost overall performance of an HBM by implementing functionalities as disclosed herein in an HBM logic die. One example embodiment of an architecture disclosed herein uses a bit map to store locations of zero values of sparse data and sends a corresponding communication to a memory controller of a host processing device that particular sparse writes may be dropped or eliminated, thereby saving bus cycles that may be used for other operations. Another example embodiment of an architecture disclosed herein detects similarities appearing in data in consecutive data writes and uses data-compression techniques and/or logging to boost application and HBM performance. When data compression is used, the compressed data may be compressed as a series of blocks in a memory of the HBM system architecture.

One embodiment of an HBM system architecture disclosed herein implements functions physically close to an HBM memory system to use data sparsity and data-value similarity, thereby increasing memory-system performance without any changes to command and/or address bus protocols. As used herein, the terms "close" or "closeness" refer to functions and/or functionality implemented on a logic die under an HBM stack according to the subject matter disclosed herein. Such functions and/or functionality may also be implemented in input/output (TO) periphery inside of a DRAM chip without affecting the core arrays. The closeness of a function with respect to an HBM may provide usefulness because HBM logic dies may have large available area that may implement bitmaps in SRAM that cannot otherwise be implemented inside accelerators, such as a GPU. SRAM of an accelerator may be a precious resource that may be used to accelerate matrix/tensor operations, whereas an SRAM memory in, for example, an HBM logic die may be used for near-memory acceleration functions like the examples described herein. In another embodiment disclosed herein, address locations (metadata) of zero-valued data may be stored in a large address space that may be located on an HBM logic die. Functional logic disclosed herein that detects data sparsity and that is executed by a logic die stacked under an HBM memory may be used to compactly store a bit map that contains locations of zeros in, for example, SRAM, thereby enabling sparse memory writes to be detected and dropped or eliminated. Similarly, functionality disclosed herein may be configured to detect data similarity among consecutive writes and compress similar values. This may save memory bus cycles and may be used to provide an overall higher number of memory transfers, thereby increasing data bandwidth to a GPU, which may be sensitive to data bandwidth.

Figure 4A:
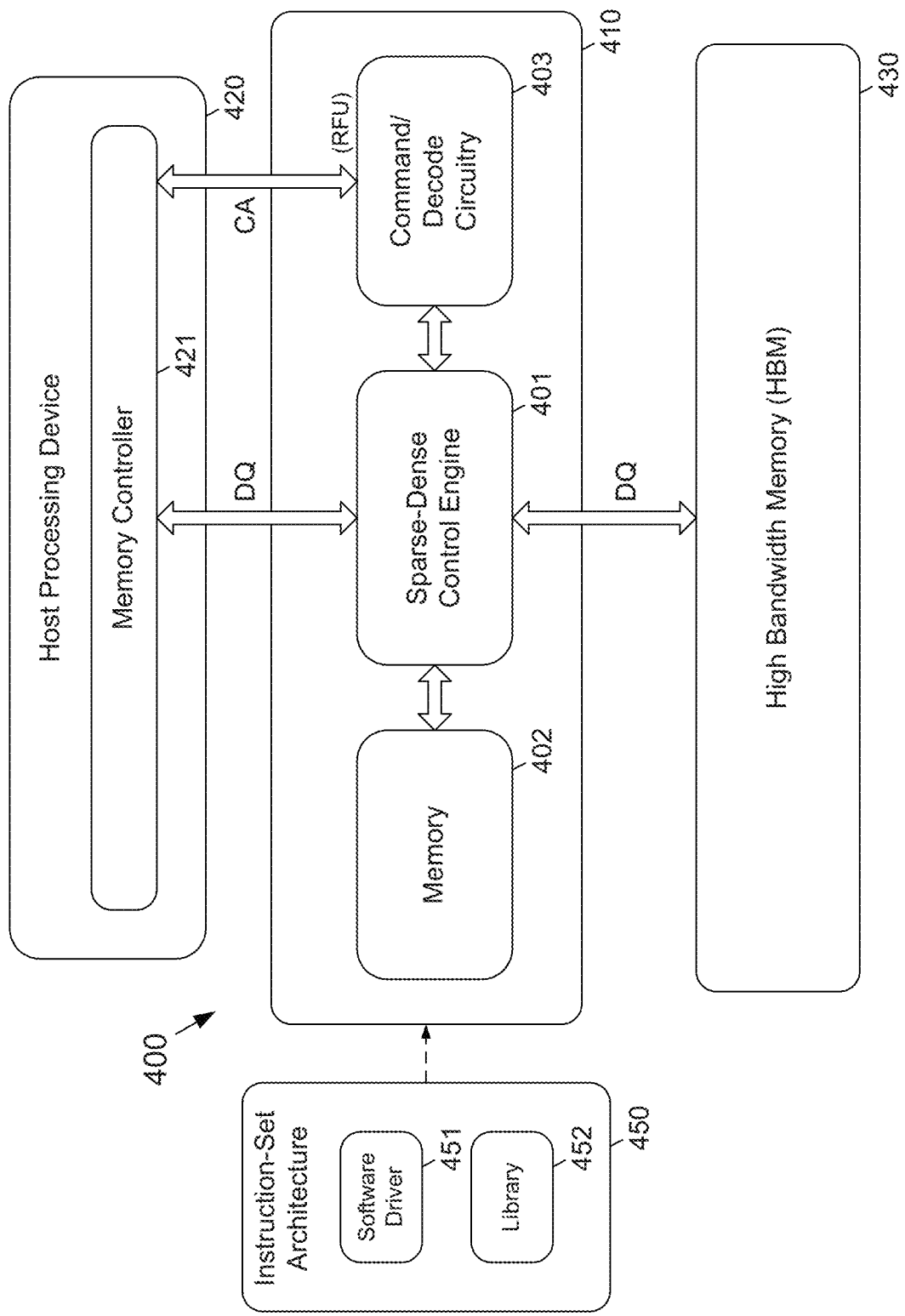
FIG. 4A depicts a block diagram of an example embodiment of an HBM system according to the subject matter disclosed herein.

FIG. 4A depicts a block diagram of an example embodiment of an HBM 400 according to the subject matter disclosed herein. The HBM system 400 may include a sparse-dense control engine 401 and a memory 402. In one embodiment, the HBM system 400 may utilize a large buffer die area and may include logic and SRAM. The sparse-dense control engine 401 may provide functionality to determine the sparseness or density of data with respect to zero values. The sparse-dense control engine 401 may be implemented as any combination of hardware and software, and may be referred to as a module. In one embodiment, the memory 402 may be SRAM. The HBM system 400 may be located on a buffer die 410 that is between a host processing device 420, such as a CPU, a GPU, or a TPU, and an HBM 430.

In one embodiment, the HBM system 400 may detect whether data associated with a data write request has sparse data characteristics and may use command/decode circuitry 403 to signal, or communicate, information relating to detection of sparse data characteristics to a memory controller 421 of the host processing device 420 either through a message and/or through a reserved for future use (RFU) pin. Sparse data characteristics may be based on whether the data contains a predetermined percentage of values that equal 0.

Alternatively, the HBM system 400 may detect whether data associated with a data write request has data similarity characteristics and may use command/decode circuitry 403 to signal, or communicate, information relating to detection of data similarity characteristics to the memory controller 421 of the host processing device 420 either through a message and/or through an RFU pin. Identification of data-value similarity may be based on a data granularity, also referred to herein as spatial value locality, which may be automatically determined and/or user selectable. Data-value similarity may also be based on a coding technique that measures a Hamming distance between two data values and assigns a corresponding similarity score.

In operation, the sparse-dense control engine 401 receives a data write request from the host processing device 420 and determines whether the data associated with the write request has sparse data characteristics. That is, the sparse-dense control engine 401 determines whether more than a predetermined percentage of the values of the data associated with the write request equal 0. In one embodiment, data of a write request is considered to be sparse if, for example, about 40% or more of the data equals 0. Other percentages are also possible for data of a write request to be considered sparse data. Additionally, the granularity of the data width may be made finer (i.e., 4 kB to 1 kB, 1 kB to 128 B, or 128 B to 32 B) or coarser in order to change the number of entries that may be considered to be sparse while also managing the metadata overhead for tracking sparse entries. Changes in granularity may be signaled through an RFU pin or an error correction code (ECC) pin.

If the sparse-dense control engine 401 determines that write data is sparse, the sparse-dense control engine 401 stores, in the memory 402, metadata relating to the addresses of data equaling 0. The sparse-dense control engine 401 then communicates to the memory controller 421 and/or the HBM stack that data writes to the HBM 430 may be dropped, or eliminated, for the sparse data equaling 0. The communication that data writes may be dropped may be sent through the command/decode circuitry 403 to the memory controller 421 of the host processing device 420 so that the cycles that would have been used by the host processing device 120 to write the 0 value data to the HBM 430 are available to be used for other tasks. In an alternative embodiment, the memory controller 421 may be signaled to host processing device 420 through an RFU pin that may be available between the buffer die 410 and the host processing device 420. Additionally or alternatively, the HBM 430 may be signaled to by the sparse-dense control engine 401 that the cycles that would have been used to write the 0 value data to the HBM are available to be used for other tasks.

The address of each 0 value may be directly logged into the memory 402. In some examples, the logged address may be 32 bits. In other examples, the address may include more or less than 32 bits. In one embodiment, the memory 402 may be organized as a cache that stores logged addresses. In one embodiment, the memory 402 may be organized as a row-buffer cache. In yet another example, the logged addresses may form a bit map in which each bit represents an access block. The bit map for this embodiment may be compressed to reduce its size. When compressed, the bit map may form a cache line having a size that is based on the cache size of the host processing device 420. Preset bits may be used to select exact values so that encoding may be reduced to exact sizes. If, for example, the host processing device 420 has a memory capacity of 8 gigabyte (GB) and a cache line of 128 bytes, the bit map may have 64 million (M) entries. A 64 megabit (Mb) map may be used to represent the 64 M entries is 8 MB is size and may be compressed to be only 2 MB in size depending on the compression technique. Alternatively, metadata may be stored in the memory 402, such as two to three bits per access block. The size of the memory 201 may set how many metadata entries may be stored in the memory 201.

During a data read request, the bit map may be decompressed if there is a hit, or a match, on an address stored in the bit map. Decompression may proceed speculatively for all of the columns inside a DRAM row as soon as an ACTIVATE command has been sent by a host processing device 420 for a particular row, thereby ensuring a minimal latency overhead for decompression. As used herein, the term "speculatively" means that the corresponding compressed entries of all the columns inside an activated DRAM row may be assumed as having been requested by a host, thereby helping in partially hiding the decompression latency by starting the process early and not waiting until one specific column command has been issued tRCD cycles after an ACT command. Based on using metadata, a read access may have the computational complexity of O(1).

In one embodiment, a special-purpose instruction set architecture 450 may be used to instantiate and execute operations in the HBM system 400 according to the subject matter disclosed herein. An application programming interface (API) that may include a software driver 451 and a library 452 may be provided as part of the special-purpose instruction set architecture 450 that accesses the HBM system 400 to transparently integrate the functionality disclosed herein into any existing machine-learning frameworks.

Figure 5:
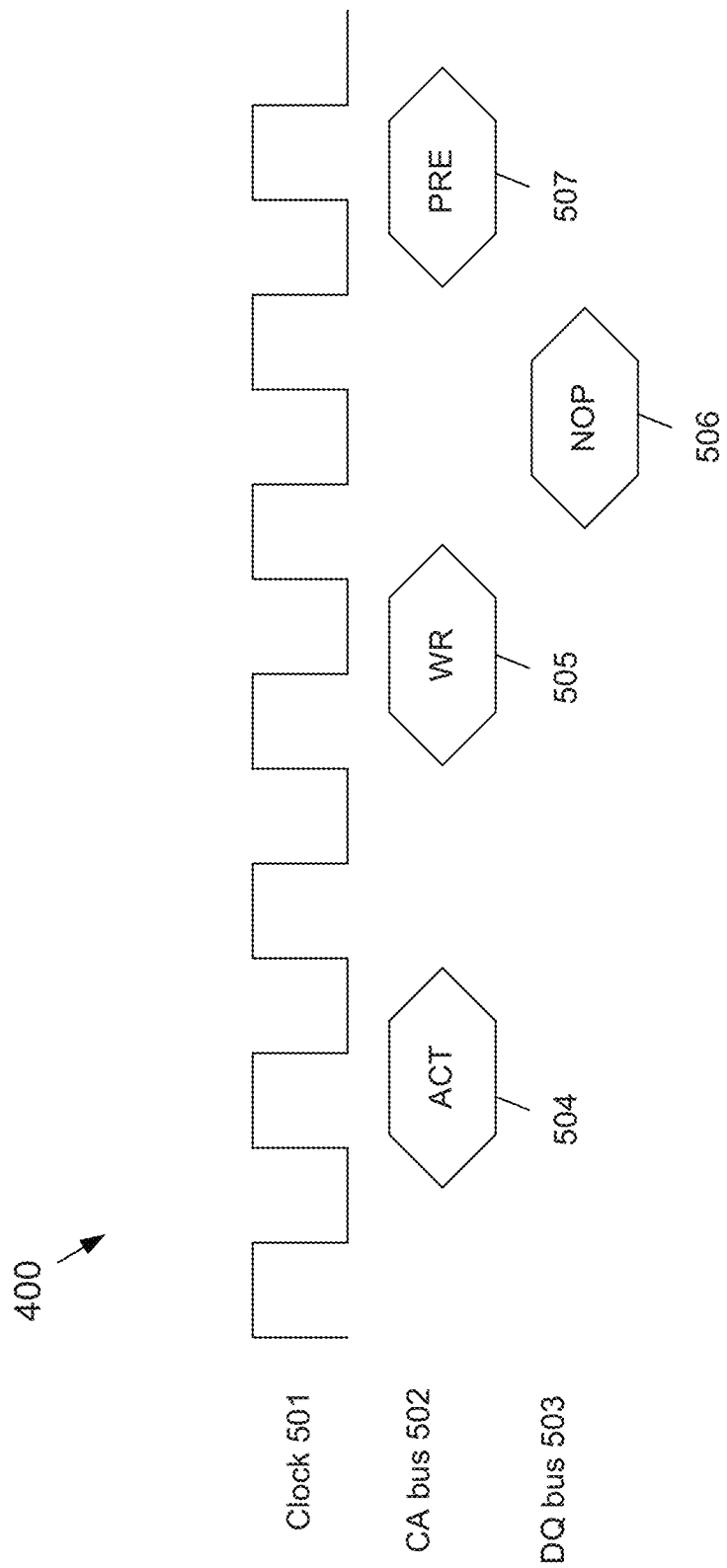
FIG. 5 is a relative timing diagram depicting a data write request operation if data associated with the write request is sparse data according to the subject matter disclosed herein.

FIG. 5 is a relative timing diagram 500 depicting a data write request operation if data associated with the write request contains sparse data according to the subject matter disclosed herein. The timing diagram 500 includes the relative timing of a clock signal 501, a CA bus 502 and a data (DQ) bus 503 during the data write request operation. The portion of the CA bus 502 depicted in FIG. 5 may extend between the host computing device 120 and the sparse-dense control engine 101, whereas the portion of the DQ bus 503 depicted may extend between the sparse-dense control engine 401 and the memory stack of an HBM memory 430.

Initially, the host computing device 420 sends an activation (ACT) command 504 followed by a write request (WR) command 505. For this example, the sparse-dense control engine 401 determines that write data is sparse, and the sparse-dense control engine 401 drops, or eliminates, data writes to the HBM 430 for the data equaling 0 as represented by a no-operation (NOP) 506. The host computing device 420 continues with the write request by sending a precharge (PRE) command 207. In one embodiment, precharge may close an opened row across a DRAM bank and may make the bank ready for the next row activation. More specifically, a precharge may raise the internal bitline voltages back to Vdd/2 to be able to sense the row values after the next activation. During the time that the NOP is being executed, the clock cycles and the DQ bus are available for other operations. As used herein, the term "other operations" refers to other regular DRAM read, write and activate commands that may use the freed or available cycles.

Figure 4B:
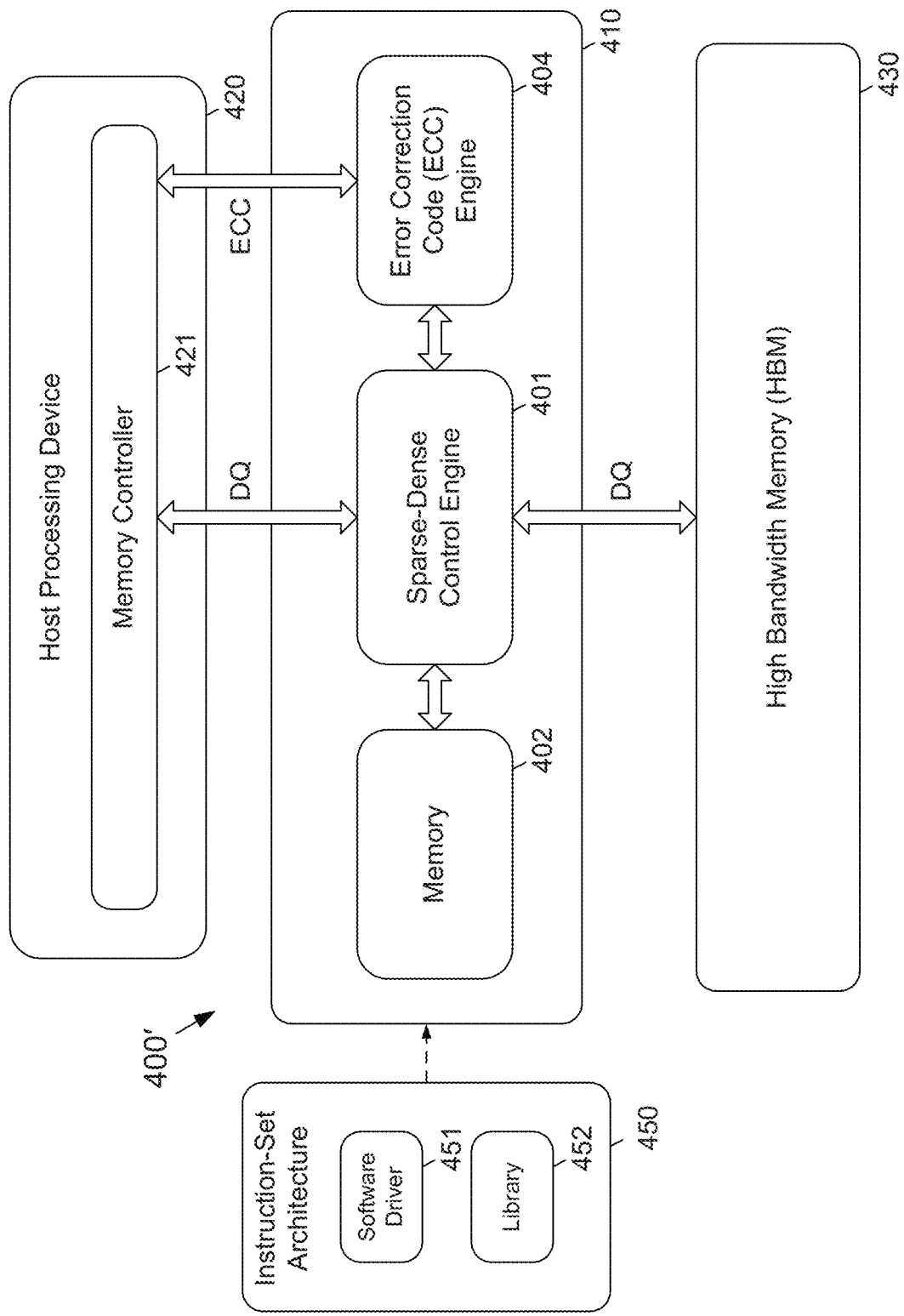
FIG. 4B depicts a block diagram of another example embodiment of an HBM system according to the subject matter disclosed herein.

FIG. 4B depicts a block diagram of another example embodiment of a HBM system 400' according to the subject matter disclosed herein. Similar to the HBM system 400 in FIG. 4A, the HBM system 400' may be located on a buffer die 410 between a host processing device 420, such as a CPU, a GPU, or a TPU, and an HBM 430. The smart data mover 400' may include a sparse-dense control engine 401 and a memory 402. In one embodiment, the memory 402 may be SRAM. In one embodiment, the HBM system 400' may use ECC engine 404 to signal, or communicate, information relating to detection of sparse data characteristics or of detection of data similarity characteristics to the memory controller 421 of the host processing device 420. ECC functionality is not typically used during training of a deep neural network, so the communication paths associated with an ECC engine 404 may be reconfigured to signal, or communicate, that data write operations may be dropped, or eliminated, and the memory cycles may be used for other operations.

Operation of the HBM system 401' is similar to the operation of the HBM system 400 depicted in FIG. 4A. The sparse-dense control engine 401 receives a data write request from the host processing device 420 and determines whether the data associated with the write request is sparse data. That is, the sparse-dense control engine determines whether more than a predetermined percentage of the values of the data associated with the write request equal 0. In one embodiment, data of a write request is considered to be sparse if, for example, about 40% or more of the data equals 0. If the sparse-dense control engine 401 determines that write data is sparse, the sparse-dense control engine 401 may store metadata in the memory 402 relating to the addresses of data equaling 0. The sparse-dense control engine 401 then drops, or eliminates, data writes to the HBM 430 for the data equaling 0, and sends a signal through the ECC circuitry 404 to the memory controller 421 of the host processing device 420 that the cycles that would have been used to write the 0 value data to the HBM 430 are available to be used for other tasks. In an alternative embodiment, the memory controller 421 may be signaled through a reserved for future use (RFU) pin that may be available between the buffer die 410 and the host processing device 420.

For both the HBM system 400 and the HBM system 401', a data read request may include a parallel or sideband lookup to the HBM memory and the memory 402. There may be a small latency associated with a data read request, however, such a latency may not adversely affect the host processing device 420. Corresponding map entries for a whole row may be fetched into an HBM register. A column access may be first looked up in the memory 402, and if there is a match, the sparse data may be returned over a sparse-data bus between the memory 402 and the sparse-dense control engine. If there is not a match, the requested data is returned over the DQ bus between the HBM 430 ad the sparse-dense control engine 401 with an additional latency that if there was a match for the data stored in the memory 402. A sideband lookup requests the corresponding metadata for an address. The metadata may then be used in parallel to determine whether the access may be a "sparse" or a "dense" access in which a main motivation may be to eliminate reading zero values out of the HBM. If an access is determined a sparse access, a read command is not issued and the cycles are freed. If an access is determined to be a dense access, a read command is issue and the "dense" data is read from the HBM. A return path on an ECC/DQ bus may depend on sparse/dense access. An ECC path may provide control information that a value is zero. If control information on an ECC path indicates that the value is non-zero, a regular read command may be issued and the read data may be returned on the DQ bus. When the ECC path is used for sparse/dense access, the HBM logic is able to implement ECC functionality, so the read values may be protected from errors up to the logic die. Data transmission from DRAM to host, however, may have errors. A cyclic redundancy check (CRC) implemented in, for example, a host may correct and detect of this kind. Freed ECC pins may be used in the above described mechanism to probe whether read data is sparse (during DRAM activate command). If the data is sparse, no read command may be issued and the row may be closed with a precharge command.

An alternative example embodiment of an HBM system may have either configuration depicted in FIG. 4A or 4B and may detect data-value similarity between consecutive data write requests. This alternative example embodiment may compress and/or may log the similarity data to boost application performance by reducing the width of data write accesses and making the available bus width for other operations both internal and external to the HBM 430. Data-value similarity and spatial locality may help memory bandwidth compression be performed in the buffer die 410. Metadata may be generated that may be used to log detected data similarity. Identification of data-value similarity may be based on data granularity, which may be automatically determined and/or user selectable. Data-value similarity may also be based on a coding technique that measures a Hamming distance between two data values and assigns a corresponding similarity score. Spare pins, such as ECC pins and/or RFU pins may be used to signal available bus width to both the external host processing device 420 and/or the HBM 430.

The sparse-dense control engine 401 may be configured to track the data of successive the data write requests and encode data exhibiting data-value similarity using any suitable encoding technique. The encoded data and/or metadata associated with the encoded data may be stored in the memory 402. Data read requests may utilize parallel lookups to both the memory 402 and the HBM memory 430. If a match occurs in the metadata stored in the memory 402, the encoded data may be decoded and returned to the host processing device. The size of the metadata may vary from entry to entry depending upon the encoding technique used and may be changed to fit into the cache size of the memory 402. Additionally, the size of the metadata may be a function of the cache size/sector of the host processing device 401. In one embodiment, the memory controller 421 may track prior values and select an encoding scheme to reduce data width. In one embodiment, the size of the metadata may be dynamically changed to a different encoding scheme as a background process and/or during refresh operation of the HBM 430. The decoding process may yield the coding scheme used in the encoding process, special optimization bits, number of similar values, etc.

Figure 6:
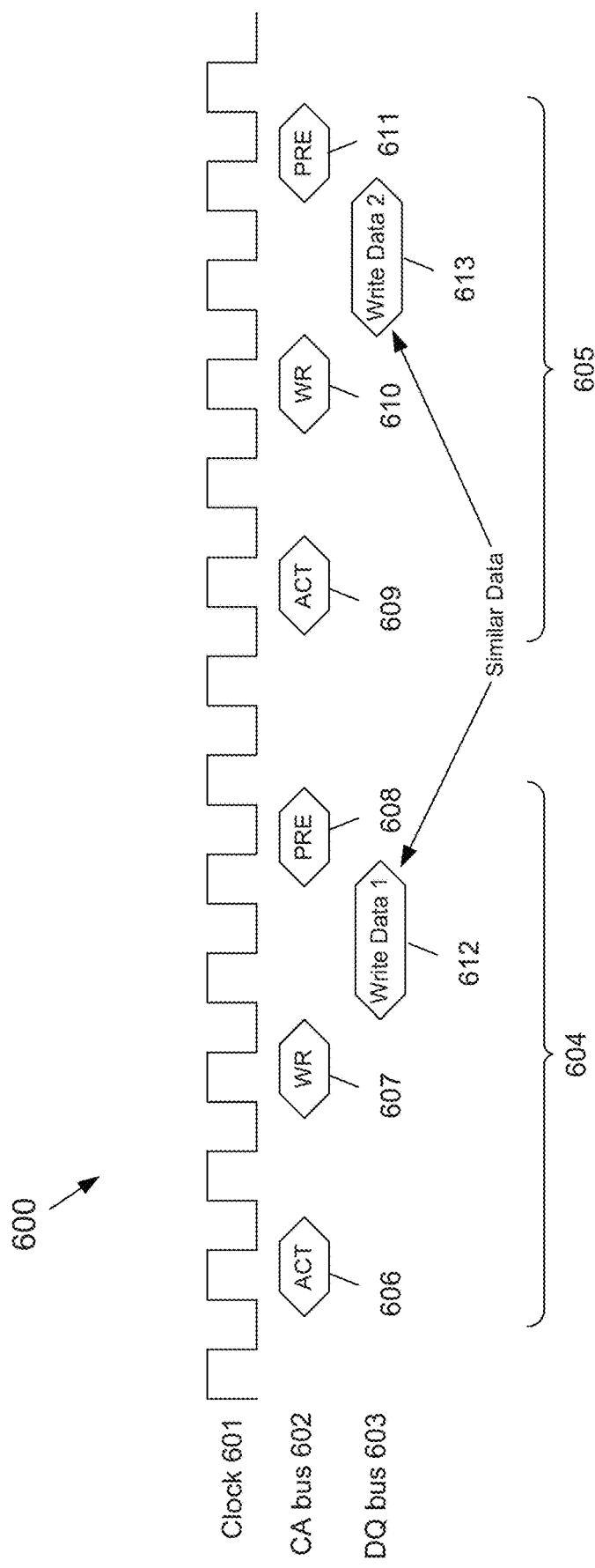
FIG. 6 is a relative timing diagram depicting data write request operations if data associated with consecutive write requests is has data-value similarity according to the subject matter disclosed herein.

FIG. 6 is a relative timing diagram 600 depicting data write request operations if data associated with consecutive write requests has data-value similarity, according to the subject matter disclosed herein. The timing diagram 600 includes the relative timing of a clock signal 601, a CA bus 602 and a DQ bus 603.

For a first of two consecutive data write requests 604 and 605, the host computing device sends a first activation (ACT1) command 606, a first write request (WR1) command 607, and a precharge (PRE) command 608, followed by a second activation (ACT2) command 609, a second write request (WR2) command 610 and a precharge (PRE) command 611. For this example, if the sparse-dense control engine 401 determines that the data 612 and 613 of the two write requests 604 and 605 has data-value similarity characteristics, the sparse-dense control engine 401 encodes the similar data, stores the encoded data and metadata for the encoded data in the memory 402, and signals (not shown) that there is bus width availability that may be used for other operations, such as, read, write and activate commands that are used for normal DRAM accesses. As these operations are scheduled in the freed slots, the overall bandwidth efficiency may be improved and may throughput may be improved.

Figure 7:
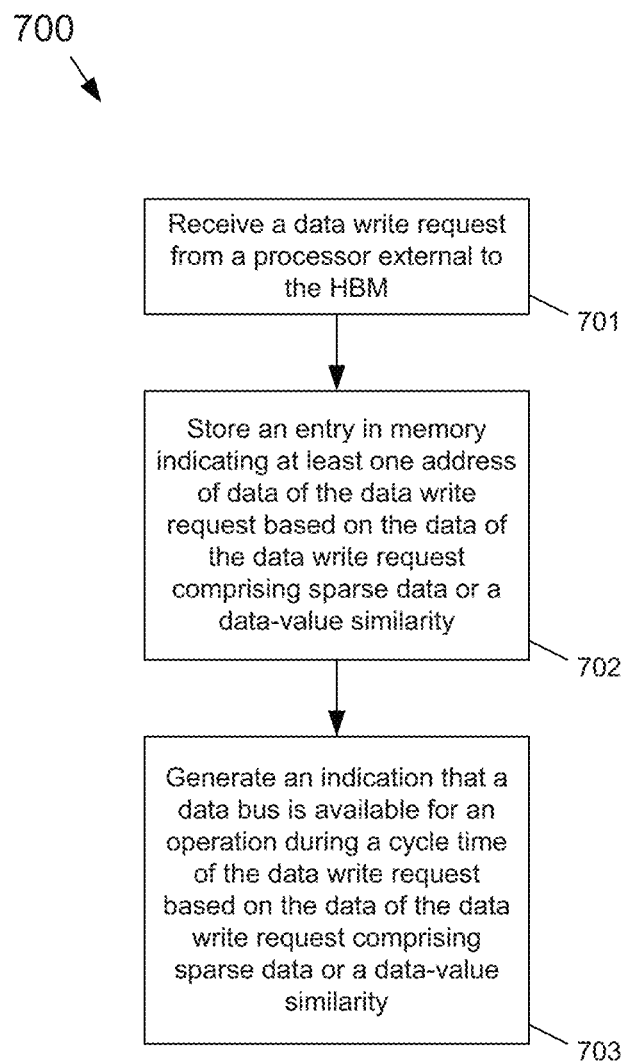
FIG. 7 is a flowchart of an example embodiment of a method of boosting overall performance of an HBM in response to a data write request operation if data associated with the write request is sparse data or a data-value similarity according to the subject matter disclosed herein.

FIG. 7 is a flowchart 700 of an example embodiment of a method of boosting overall performance of an HBM in response to a data write request operation if data associated with the write request is sparse data or a data-value similarity according to the subject matter disclosed herein. At 701, a data write request is received by a controller of an HBM, such as the sparse-dense control engine 401 in FIG. 4A, from a processor, such as the host processing device 420 in FIG. 4A, that is external to the HBM. At 702, an entry is stored in memory, such as the memory 402 in FIG. 4A, indicating at least one address of data of the data write request based on the data of the data write request comprising sparse data or a data-value similarity. At 703, an indication is generated that a data bus is available for an operation during a cycle time of the data write request based on the data of the data write request comprising sparse data or the data-value similarity.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. An apparatus comprising:
   a memory;
   a data bus configured to transfer data from a processor to a high-bandwidth memory (HBM); and
   a controller that receives a data write request from the processor, the controller:
   determining data of the data write request comprises sparse data;
   storing, based on the data of the data write request comprising sparse data, an entry in the memory, wherein the entry comprises metadata of the data of the data write request;
   generating, based on the data of the data write request comprising sparse data, an indication that the data bus is available for an operation by the processor; and
   communicating the indication to the processor.

2. The apparatus of claim 1, wherein:
   sparse data comprises a percentage of data values of the data write request equal to zero; and
   the percentage of data values equal to zero is based on a data granularity.

3. The apparatus of claim 1, wherein the entry is a first entry, the metadata is first metadata, and, based on the data of the data write request comprising a data-value similarity being an amount of similarity based on a size of data granularity, the controller further stores a second entry in the memory, wherein the second entry comprises second metadata of data of the data write request.

4. The apparatus of claim 1, wherein the controller further receives a data read request from the processor for a read access to the HBM, and
   wherein the controller further determines an address corresponding to the data read request is stored as an entry in the memory.

5. The apparatus of claim 4, wherein the controller further performs a sideband access, a parallel memory lookup, and an HBM lookup.

6. The apparatus of claim 3, wherein the second entry comprises information relating to the data-value similarity of the data write request, and
wherein the controller further compresses the entry to reduce a data width.

7. The apparatus of claim 1,
wherein the controller further compresses the metadata as a series of blocks in the memory.

8. A system, comprising:
a processor;
a high-bandwidth memory (HBM);
a data bus configured to transfer data from the processor to the HBM; and
a controller that includes a memory, the controller:
  receiving a data write request from the processor,
  determining data of the data write request comprises sparse data,
  storing, based on data of the data write request comprising sparse data, an entry in the memory of the controller, wherein the entry comprises metadata of the data of the data write request,
  generating, based on the data write request comprising sparse data, an indication that the data bus is available for an operation by the processor, and
  communicating the indication to the processor.

9. The system of claim 8, wherein:
the sparse data comprises a percentage of data values of data of the data write request equal to zero; and
the percentage of data values equal to zero of sparse data is based on a data granularity.

10. The system of claim 8, wherein the entry is a first entry, the metadata is first metadata, the controller further:
stores, based on data of the data write request further comprising data-value similarity, a second entry in the memory of the controller, wherein the second entry comprises second metadata of the data of the data write request, and
generates, based on the data write request further comprising data-value similarity, the indication that a data bus is available for the operation, and
wherein data of the data write request comprises an amount of spatial value locality, and
wherein the amount of spatial value locality of the data-value similarity is based on a data granularity.

11. The system of claim 8, wherein the controller further receives a data read request from the processor for a read access to the HBM, and
wherein the controller further determines an address corresponding to the data read request is stored as an entry in the memory.

12. The system of claim 11, wherein the controller further performs a sideband access, a parallel memory lookup, and an HBM lookup.

13. The system of claim 8, wherein the first entry further comprises information relating to data-value similarity of the data of the data write request, and
wherein the controller further compresses the entry to reduce a data width.

14. The system of claim 8,
wherein the controller further compresses the metadata as a series of blocks in the memory.

15. A method, comprising:
receiving, at a controller of a high-bandwidth memory (HBM), a data write request from a processor, wherein the HBM comprises a data bus configured to transfer data from the processor to the HBM;
determining, by the controller, data of the data write request comprises sparse data;
storing, by the controller, based on data of the data write request comprising sparse data, an entry in a memory of the controller, wherein the entry comprises metadata of data of the data write request;
generating, by the controller, based on data of the data write request comprising sparse data, an indication that data bus is available for an operation by the processor; and
communicating the indication to the processor.

16. The method of claim 15, wherein the entry is a first entry, the metadata is first metadata, and sparse data comprises a percentage of data values of data of the data write request equal to zero, wherein the data of the data write request comprises an amount of spatial value locality, and the indication is based on data of the data write comprising the amount of spatial value locality,
the method further comprising:
  generating, by the controller, based on the data write request further comprising the amount of spatial value locality, the indication that the data bus is available;
  storing, by the controller, based on data of the data write request comprising a data-value similar, a second entry in the memory of the controller, wherein the second entry comprises second metadata of data of the data write request; and
  generating, by the controller, based on the data of the data write request comprising data-value similarity, an indication that the data bus is available for an operation.

17. The method of claim 15, wherein the data of the data write request comprises a percentage of data values of data of the data write request equal to zero, and the indication is based on the data of the data write request comprising the percentage of data values of data of the data write request equal to zero,
the method further comprising:
  generating, by the controller, based on the data write request further comprising sparse data, the indication that a data bus is available for the operation,
  wherein the percentage of data values equal to zero of sparse data is based on a data granularity.

18. The method of claim 15, further comprising:
receiving a data read request from the processor for a read access to the HBM;
determining that an address corresponding to the data read request is stored as an entry in the memory; and
performing a sideband access, a parallel memory lookup, and an HBM lookup based on the address corresponding to the data read request being stored as an entry in the memory.

19. The method of claim 16, wherein the second entry comprises information relating to the data-value similarity of data of the data write request,
the method further comprising compressing the second entry to reduce a data width.

20. The method claim 15,
further comprising compressing the metadata as a series of blocks in the memory.

* * * * *